(12) United States Patent
Hartmann et al.

(10) Patent No.: US 7,718,727 B2
(45) Date of Patent: *May 18, 2010

(54) FLUOROPLASTIC SILICONE VULCANIZATES

(75) Inventors: Mark Hartmann, Midland, MI (US);
Igor Chorvath, Midland, MI (US);
Lauren Tonge, Sanford, MI (US);
Robert Oldinski, Bay City, MI (US);
James Thompson, Sanford, MI (US);
David Romenesko, Midland, MI (US);
Kermit Kwan, Midland, MI (US);
Stephen Warren, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/437,050

(22) Filed: May 7, 2009

(65) Prior Publication Data

US 2009/0215959 A1  Aug. 27, 2009

Related U.S. Application Data

(62) Division of application No. 10/556,188, filed as application No. PCT/US2004/018229 on Jun. 4, 2004, now Pat. No. 7,547,742.

(60) Provisional application No. 60/476,767, filed on Jun. 6, 2003.

(51) Int. Cl.
*C08L 47/00* (2006.01)
*C08L 27/12* (2006.01)
*C08L 51/08* (2006.01)
*C08L 83/04* (2006.01)
*C08L 43/04* (2006.01)

(52) U.S. Cl. .................. 524/545; 524/413; 525/104

(58) Field of Classification Search .................. 525/192
See application file for complete search history.

(56) References Cited

U.S. PATENT DOCUMENTS

| | | |
|---|---|---|
| 3,865,897 A | 2/1975 | Falender et al. |
| 3,969,308 A | 7/1976 | Penneck |
| 4,263,414 A | 4/1981 | West |
| 4,732,931 A | 3/1988 | Maxson |
| 4,882,386 A | 11/1989 | Stella |
| 4,904,726 A | 2/1990 | Morgan et al. |
| 4,946,883 A | 8/1990 | Kunimatsu et al. |
| 5,010,137 A | 4/1991 | Umeda et al. |
| 5,204,408 A | 4/1993 | Konno et al. |
| 5,209,872 A | 5/1993 | Takahashi et al. |
| 5,457,158 A | 10/1995 | Caporiccio et al. |
| 5,480,930 A | 1/1996 | Gentle et al. |
| 5,534,347 A | 7/1996 | Chen et al. |
| 5,554,689 A | 9/1996 | Langstein et al. |
| 5,589,544 A | 12/1996 | Horrion |
| 5,604,288 A | 2/1997 | Furukawa et al. |
| 6,015,858 A | 1/2000 | Gornowicz |
| 6,035,780 A | 3/2000 | Badesha et al. |
| 6,225,409 B1 | 5/2001 | Davis et al. |
| 6,407,159 B2 | 6/2002 | Sugimoto et al. |
| 6,479,580 B1 | 11/2002 | Chorvath et al. |
| 6,544,710 B2 | 4/2003 | Livengood et al. |
| 6,586,100 B1 | 7/2003 | Pickering et al. |
| 6,613,846 B2 | 9/2003 | Hintzer et al. |
| 6,676,996 B2 | 1/2004 | Pickering et al. |
| 2001/0008914 A1 | 7/2001 | Osawa et al. |
| 2002/0137838 A1 | 9/2002 | Silvi et al. |
| 2004/0002012 A1 | 1/2004 | Pavlisko et al. |

FOREIGN PATENT DOCUMENTS

| | | |
|---|---|---|
| EP | 636663 | 2/1995 |
| WO | WO03104322 | 12/2003 |

*Primary Examiner*—Randy Gulakowski
*Assistant Examiner*—Robert Loewe
(74) *Attorney, Agent, or Firm*—Alan Zombeck

(57) ABSTRACT

Fluoroplastics containing fluorocarbon resins and silicones are prepared by first mixing a fluorocarbon resin with a compatibilizer, then adding a curable organopolysiloxane with a radical initiator, and vulcanizing the organopolysiloxane in the mixture. The fluoroplastics can be processed by various techniques, such as extrusion, vacuum forming, injection molding, blow molding or compression molding, to fabricate plastic parts. The resulting fabricated parts can be re-processed (recycled) with little or no degradation of mechanical properties.

6 Claims, No Drawings

FLUOROPLASTIC SILICONE VULCANIZATES

This is a Divisional Application of U.S. patent application Ser. No. 10/556,188, filed Nov. 15, 2006, now U.S. Pat. No. 7,457,742 which was a U.S. national stage filing under 35 U.S.C. §371 of PCT Application No. PCT/US2004/018229 filed on Jun. 4, 2004 which claimed the benefit of U.S. Provisional Patent Application No. 60/476,767 filed Jun. 6, 2003 under 35 U.S.C. §119 (e). U.S. patent application Ser. No. 10/556,188, PCT Application No. PCT/US2004/018229 and U.S. Provisional Patent Application No. 60/476,767 are hereby incorporated by reference.

The present invention relates to fluoroplastics containing fluorocarbon resins and silicones. The fluoroplastics are prepared by first mixing a fluorocarbon resin with a compatibilizer, then adding a curable organopolysiloxane with a radical initiator, and vulcanizing the organopolysiloxane in the mixture. The fluoroplastic of the present invention can be processed by various techniques, such as extrusion, vacuum forming, injection molding, blow molding or compression molding, to fabricate plastic parts. The resulting fabricated parts can be re-processed (recycled) with little or no degradation of mechanical properties.

Dynamic vulcanization techniques have been used to prepare thermoplastic compositions based on fluorocarbon resins, such as taught in U.S. Pat. No. 6,015,858. However, the '858 patent compositions are based on the use of a platinum catalyst to cure the silicone portion of the compositions. There is no teaching or suggestion to use alternative cure systems such as radical initiators. In many applications, it is desirable to prepare thermoplastic compositions based on fluorocarbon resins and silicones via an alternative cure of the silicone portion. For example, platinum free compositions may be desired in certain applications, yet in other instances where manufacturing economics are important, it may be desirable to use a less costly cure agent such as a radical initiator. While less expensive, radical initiators can lead to other problems with their use during a vulcanization process. In particular, their volatility at elevated temperatures can pose a safety issue.

The present invention provides a method for preparing fluoroplastic compositions containing fluorocarbon resins and silicones using vulcanization to cure the silicone via a radical initiator. The method for preparing a fluoroplastic composition comprises:

(I) mixing
  (A) a fluorocarbon resin having a glass transition temperature above 23° C.,
  (B) a compatibilizer,
  (C) an optional catalyst;
(II) mixing the product of step (I) with
  (D) a silicone base comprising a curable organopolysiloxane,
  (E) a radical initiator in an amount sufficient to cure said organopolysiloxane; and
(III) vulcanizing the organopolysiloxane;

wherein the weight ratio of fluorocarbon resin (A) to silicone base (B) in the elastomeric base composition ranges from 95:5 to 30:70.

The invention further relates to the fluoroplastic compositions obtained by the present method, and articles of manufacture comprising the thermoplastic compositions.

The first step (I) of the method of the present invention is mixing;
  (A) a fluorocarbon resin having a glass transition temperature above 23° C.,
  (B) a compatibilizer,
  (C) an optional catalyst.

The first step of the method produces a product, herein referred to as "the product of step (I)". Typically, but not required, the product of step (I) can be considered as a modified fluorocarbon resin. As used herein, the term "modified fluorocarbon resin" refers to a modified fluorocarbon resin that can be considered either as chemically modified or physically modified depending on the selection of components (A), (B), and optionally (C), and accompanying conditions used in this mixing step that are further delineated infra. In the embodiment of the present invention that prepares a chemically modified fluorocarbon resin, components (A), (B), and optionally (C) are selected and mixed in such a manner to produce a reaction product of the fluorocarbon resin and the compatibilizer. In the embodiment of the present invention that prepares a physically modified fluorocarbon resin, components (A), (B), and optionally (C) are selected and mixed in such a manner to produce a physical mixture product of the fluorocarbon resin and the compatibilizer. In either case, when the product of step (I) produces a modified fluorocarbon resin, the fluorocarbon resin (A) is modified in such a manner so as to produce a fluorocarbon/silicone mixture which upon further mixing with a silicone base composition and vulcanization of silicone will produce a fluoroplastic composition having a continuous fluorocarbon resin phase and a discontinuous cured (i.e. internal phase) silicone phase.

Component (A) of the present invention is a fluorocarbon (FC) resin. The FC resin can be any fluoroplastic having a melting point ($T_m$) above room temperature (RT) or 23° C. and a glass transition temperature ($T_g$) above room temperature or 23° C. "Glass transition temperature" means the temperature at which a polymer changes from a glassy vitreous state to a plastic state. The glass transition temperature can be determined by conventional methods, such as dynamic mechanical analysis (DMA) and Differential Scanning Calorimetry (DSC). Representative, non-limiting examples of FC resins can be found in summary articles of this class of materials such as in: "Vinylidene Fluoride-Based Thermoplastics (Overview and Commercial Aspects)", J. S. Humphrey, Jr., "Tetrafluoroethylene Copolymers (Overview)", T. Takakura, "Fluorinated Plastics Amorphous", M. H. Hung, P. R. Resnick, B. E. Smart, W. H. Buck all of Polymeric Material Encylopedia, 1996 Version 1.1, CRC Press, NY; "Fluoropolymers", K-L. Ring, A. Leder, and M Ishikawa-Yamaki, Chemical Economics Handbook-SRI International 2000, Plastics and Resins 580.0700A, all of which are hereby incorporated by reference. Thus, it is contemplated that the FC resin may be a homopolymer, copolymer, or terepolymer of the following fluorine comprising monomers selected from the list: tetrafluoroethylene, vinylidene difluoride, chlorotrifluoroethylene, hexafluoropropylene, and vinyl fluoride. These monomers can also be copolymerized with copolymerizable monomers including, but not limited to: vinyl compounds such as perfluoropropyl vinyl ether; olefin compounds such as ethylene, or hexafluoropropylene; or halogen containing polymerizable olefins such as bromotrifluoroethylene and 1-bromo-2,2-difluoroethylene. Commerically available examples are illustrated by but not limited to: poly(vinylidene difluoride), (PVDF); poly(ethylene-tetrafluoroethylene), (E-TEF); hexafluoropropylene/vinylidene fluoride, (HFP-PVDF); tetrafluoroethylene/hexafluoropropylene/vinylidene fluoride, (THV); and poly(ethylene-chlorotrifluoroethylene) (E-CTFE).

It is anticipated that the FC resin (A), can be a mixture of FC resins. However, in the chemically modified embodiment, at least 2 wt. %, alternatively at least 5 wt. %, alternatively at least 10 wt. % of the FC resin is a polymer or copolymer which must contain at least one monomer that can react with compatibilizer B for example olefinic groups or monomers containing one of the following groups: a carbon-bonded hydrogen or carbon-bonded chlorine or carbon-bonded bromine or carbon-bonded iodine.

According to the method of the present invention, the FC resin (A) is mixed with a compatibilizer (B) in the presence of an optional catalyst to produce a modified FC resin. The structure of the compatibilizer is not critical. The function of the compatibilizer is to modify the FC resin in such a manner so as to produce a fluorocarbon/silicone mixture which upon further mixing with the silicone base composition and vulcanization of silicone will produce a fluoroplastic composition having a continuous fluorocarbon resin phase and a discontinuous cured (i.e. internal phase) silicone phase. Thus, compatibilizer (B) can be selected from any hydrocarbon, organosiloxane, fluorocarbon, or combinations thereof that would be expected to modify the FC resin in a manner to enhance the mixing of the silicone base (D) with the FC resin (A) to produce a mixture having a continuous fluorocarbon phase and a discontinuous (i.e. internal phase) silicone phase. However, the compatibilizer, or the resulting modified FC resin, must not prevent the cure of the organopolysiloxane component, described infra.

In the physically modified fluorocarbon embodiment, the compatibilizer (B) can be selected from any compatibilizer known in the art to enhance the mixing of a silicone base with a FC resin. Typically, such compatibilizers are the reaction product of an organopolysiloxane and a fluorocarbon polymer. Representative non-limiting examples of such compatibilizers are described in U.S. Pat. Nos. 5,554,689 and 6,035,780, both of which are incorporated by reference herein.

In the chemically modified fluorocarbon embodiment, typically the compatibilizer (B) can be selected from the group of (B') organic (i.e., non-silicone) compounds which contain 2 or more olefin groups, (B") organopolysiloxanes containing at least 2 alkenyl groups and (B''') olefin-functional silanes which also contain at least one hydrolyzable group or at least one hydroxyl group attached to a silicon atom thereof.

Organic compatibilizer (B') can be illustrated by compounds such as diallyphthalate, triallyl isocyanurate, 2,4,6-triallyloxy-1,3,5-triazine, triallyl trimesate, 1,5-hexadiene, 1,7-octadiene, 2,2'-diallylbisphenol A, N,N'-diallyl tartardiamide, diallylurea, diallyl succinate and divinyl sulfone, inter alia.

Compatibilizer (B") may be selected from linear, branched or cyclic organopolysiloxanes having at least 2 alkenyl groups in the molecule. Examples of such organopolysiloxanes include divinyltetramethyldisiloxane, cyclotrimethyltrivinyltrisiloxane, cyclo-tetramethyltetravinyltetrasiloxane, hydroxy end-blocked polymethylvinylsiloxane, hydroxy terminated polymethylvinylsiloxane-co-polydimethylsiloxane, dimethylvinylsiloxy terminated polydimethylsiloxane, tetrakis(dimethylvinylsiloxy)silane and tris(dimethylvinylsiloxy)phenylsilane. Alternatively, compatibilizer. (B") is a vinyl terminated polymethyl vinyl siloxane (Vi-[(MeViSiO)x-(Me2SiO)y]-Vi) having a viscosity from 2 to 55,000 centistokes ($mm^2/s$) and containing 1-35% vinyl. Alternatively, compatibilizer (B") is a hydroxy terminated polymethylvinylsiloxane [HO(MeViSiO)$_x$H] oligomer having a viscosity of about 35 m·Pa–s, containing 25-30% vinyl groups and 2-4% silicon-bonded hydroxy groups.

Compatibilizer (B''') is a silane which contains at least one alkylene group, typically comprising vinylic unsaturation, as well as at least one silicon-bonded moiety selected from hydrolyzable groups or a hydroxyl group. Suitable hydrolyzable groups include alkoxy, aryloxy, acyloxy or amido groups. Examples of such silanes are vinyltriethoxysilane, vinyltrimethoxysilane, hexenyltriethoxysilane, hexenyltrimethoxy, methylvinyldisilanol, octenyltriethoxysilane, vinyltriacetoxysilane, vinyltris(2-ethoxyethoxy)silane, methylvinylbis(N-methylacetamido)silane, methylvinyldisilanol.

It is possible that a portion of the curable organopolysiloxane of the silicone base component (D) described infra, can also function as a compatibilizer. For example, a catalyst (C) can be used to first react a portion of the curable organopolysiloxane of silicone base (D) with the FC resin to produce a modified FC resin. The modified FC resin is then further mixed with the remaining silicone base (D) containing the curable organopolysiloxane, and the organopolysiloxane is dynamically vulcanized as described infra.

The amount of compatibilizer used per 100 parts of FC resin can be determined by routine experimentation. Typically, 0.05 to 15 parts by weight or alternatively 0.1 to 5 parts of the compatibilizer is used for each 100 parts of FC resin.

Optional component (C) is a catalyst. Typically, the catalyst is used in the chemically modified fluorocarbon embodiment. As such, it is typically a radical initiator selected from any organic compound which is known in the art to generate free radicals at elevated temperatures. The initiator is not specifically limited and may be any of the known azo or diazo compounds, such as 2,2'-azobisisobutyronitrile, but it is preferably selected from organic peroxides such as hydroperoxides, diacyl peroxides, ketone peroxides, peroxyesters, dialkyl peroxides, peroxydicarbonates, peroxyketals, peroxy acids, acyl alkylsulfonyl peroxides and alkyl monoperoxydicarbonates. A key requirement, however, is that the half life of the initiator be short enough so as to promote reaction of compatibilizer (B) with the FC resin (A) within the time and temperature constraints of the reaction step (I). The modification temperature, in turn, depends upon the type of FC resin and compatibilizer chosen and is typically as low as practical consistent with uniform mixing of components (A) through (C). Specific examples of suitable peroxides which may be used according to the method of the present invention include; 2,5-dimethyl-2,5-di(tert-butylperoxy)hexane, benzoyl peroxide, dicumyl peroxide, t-butyl peroxy O-toluate, cyclic peroxyketal, t-butyl hydroperoxide, t-butyl peroxypivalate, lauroyl peroxide and t-amyl peroxy 2-ethylhexanoate, di-t-butyl peroxide, 1,3-bis(t-butylperoxyisopropyl) benzene, 2,2,4-trimethylpentyl-2-hydroperoxide, 2,5-bis(t-butylperoxy)-2,5-dimethylhexyne-3, t-butyl-peroxy-3,5,5-trimethylhexanoate, cumene hydroperoxide, t-butyl peroxybenzoate and diisopropylbenzene mono hydroperoxide, inter alia. Less than 2 part by weight of peroxide per 100 parts of FC resin is typically used. Alternatively, 0.05 to 1 parts, and 0.2 to 0.7 parts, can also be employed.

Other than the specific limitations and process conditions associated with the selection of the catalyst as described above, the reaction of step (I) can occur at a variety of conditions known in the art for effecting such reactions.

The second step (II) of the method of the present invention is mixing the product of step (I) with;

(D) a silicone base comprising a curable organopolysiloxane, (E) a radical initiator in an amount sufficient to cure said organopolysiloxane.

Component (D) is a silicone base comprising a curable organopolysiloxane (D') and optionally, a filler (D"). A curable organopolysiloxane is defined herein as any organopolysiloxane having at least two curable groups present in its molecule. Organopolysiloxanes are well known in the art and are often designated as comprising any number of M units ($R_3SiO_{0.5}$), D units ($R_2SiO$), T units ($RSiO_{1.5}$), or Q units ($SiO_2$) where R is independently any monovalent hydrocarbon group. Alternatively, organopolysiloxanes are often described as having the following general formula; $[R_mSi(O)_{4-m/2}]_n$, where R is independently any monovalent hydrocarbon group and m=1-3, and n is at least two.

The organopolysiloxane in the silicone base (D) must have at least two curable groups in its molecule. As used herein, a curable group is defined as any hydrocarbon group that is capable of reacting with itself or another hydrocarbon group, or alternatively with a crosslinker to crosslink the organopolysiloxane. This crosslinking results in a cured organopolysiloxane. Representative of the types of curable organopolysiloxanes that can be used in the silicone base are the organopolysiloxanes that are known in the art to produce silicone rubbers upon curing. Representative, non-limiting examples of such organopolysiloxanes are disclosed in "Encyclopedia of Chemical Technology", by Kirk-Othmer, 4th Edition, Vol. 22, pages 82-142, John Wiley & Sons, NY which is hereby incorporated by reference. Any organopolysiloxane can be selected as component (D), and a free radical initiator would be selected as component (E) if the combination will cure within the time and temperature constraints of the vulcanization, step (III). Depending on the selection of component (E) in such free radical initiated crosslinking, any alkyl group, such as methyl, can be considered as the curable groups, since they would crosslink under such free radical initiated conditions.

The quantity of the silicone phase, as defined herein as the combination of components (D) and (E), used can vary depending on the amount of FC resin (A) used However, it is typical to use levels of FC resin (A) of 30 to 95 wt. %, alternatively, 35 to 90 wt. %, or alternatively 40 to 85 wt. % based on the total weight of components (A) through (E).

It is also convenient to report the weight ratio of fluorocarbon resin (A) to the silicone base (D), which typically ranges from 95:5 to 30:70, alternatively 90:10 to 40:60, alternatively 85:15 to 40:60.

Typically, (D') is a diorganopolysiloxane gum, or alternatively a diorganopolysiloxane which contains at least 2 alkenyl groups having 2 to 20 carbon atoms and optionally (D"), a reinforcing filler. The alkenyl group is specifically exemplified by vinyl, allyl, butenyl, pentenyl, hexenyl and decenyl, preferably vinyl or hexenyl. The position of the alkenyl functionality is not critical and it may be bonded at the molecular chain terminals, in non-terminal positions on the molecular chain or at both positions. Typically, the alkenyl group is vinyl or hexenyl and that this group is present at a level of 0.0001 to 3 mole percent, alternatively 0.0005 to 1 mole percent, in the diorganopolysiloxane. The remaining (i.e., non-alkenyl) silicon-bonded organic groups of the diorganopolysiloxane are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. It will be understood, or course, that these groups are selected such that the diorganopolysiloxane has a glass temperature (or melting point) which is below room temperature and the cured polymer is therefore elastomeric. Typically, the non-alkenyl silicon-bonded organic groups in the diorganopolysiloxane makes up at least 85, or alternatively at least 90 mole percent, of the organic groups in the diorganopolysiloxanes.

Thus, polydiorganosiloxane (D) can be a homopolymer, a copolymer or a terpolymer containing such organic groups. Examples include copolymers comprising dimethylsiloxy units and phenylmethylsiloxy units, copolymers comprising dimethylsiloxy units and 3,3,3-trifluoropropylmethylsiloxy units, copolymers of dimethylsiloxy units and diphenylsiloxy units and interpolymers of dimethylsiloxy units, diphenylsiloxy units and phenylmethylsiloxy units, among others. The molecular structure is also not critical and is exemplified by straight-chain and partially branched straight-chain structures, the linear systems being the most typical.

Specific illustrations of diorganopolysiloxane (D) include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; trimethylsiloxy-endblocked 3,3,3-trifluoropropylmethyl siloxane copolymers; trimethylsiloxy-endblocked 3,3,3-trifluoropropylmethyl-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Typical systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 85-95%.

Component (D) may also consist of combinations of two or more organopolysiloxanes. Alternatively, diorganopolysiloxane (D) is a linear polydimethylsiloxane homopolymer and is preferably terminated with a vinyl group at each end of its molecule or it is such a homopolymer which also contains at least one vinyl group along its main chain.

Typically, the molecular weight of the diorganopolysiloxane is sufficient to impart a Williams plasticity number of at least about 30 as determined by the American Society for Testing and Materials (ASTM) test method D 926. Although there is no absolute upper limit on the plasticity of component (D'), practical considerations of processability in conventional mixing equipment generally restrict this value. Typically, the plasticity number should be 40 to 200, or alternatively 50 to 150.

Methods for preparing high consistency unsaturated group-containing diorganopolysiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (D") is any filler which is known to reinforce diorganopolysiloxane (D') and is preferably selected from finely divided, heat stable minerals such as fumed and precipitated forms of silica, silica aerogels and titanium dioxide having a specific surface area of at least about 50 $m^2$/gram. The fumed form of silica is a typical reinforcing filler based on its high surface area, which can be up to 450 m²/gram. Alternatively, a fumed silica having a surface area of 50 to 400 m²/g, or alternatively 90 to 380 m²/g, can be used. The filler is added at a level of about 5 to about 150 parts by weight, alternatively 10 to 100 or alternatively 15 to 70 parts by weight, for each 100 parts by weight of diorganopolysiloxane (D').

The filler is typically treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. Component (D) may optionally contain other materials commonly used in silicone rubber formulations, including but not limited to: antioxidants, crosslinking additives, processing agents, pigments or other additives known in the art, which do not negatively effect the silicone cure step (III).

Component (E) is selected to provide a free radical cure of the organopolysiloxane. The radical initiator (E) can be selected from any of the free radical initiators described supra for the selection of component (B).

In addition to the above-mentioned major components (A) through (E), one or more optional additives (F) can be incorporated in the fluoroplastic compositions of the present invention. These optional additives can be illustrated by the following non-limiting examples: extending fillers such as quartz, calcium carbonate, and diatomaceous earth; pigments such as iron oxide and titanium oxide; fillers such as carbon black and finely divided metals; heat stabilizers such as hydrated cerric oxide, calcium hydroxide, magnesium oxide; flame retardants such as halogenated hydrocarbons, alumina trihydrate, magnesium hydroxide, wollastonite, organophosphorous compounds and other fire retardant (FR) materials; and other additives known in the art. These additives are typically added to the final composition after vulcanization, but they may also be added at any point in the preparation provided they do not interfere with the vulcanization mechanism. These additives can be the same, or different, as the additional components added to prepare the cured elastomeric compositions, described infra.

The third step (III) of the method of the present invention is vulcanizing the organopolysiloxane. The vulcanization can occur statically or dynamically. As used herein, dynamic vulcanization refers to a vulcanization process that occurs with continuous mixing of the fluoroplastic composition. The continuous mixing can be the same mixing to effect step (II), i.e. be simultaneous with the mixing of step (II), or alternatively, the mixing can occur following step (II). Alternatively, the vulcanization can occur statically. Static vulcanization refers to vulcanizing the organopolysiloxane without further mixing of the product of step (II). For example, the product of mixing from step (II) can be simply subjected to a process to cure the organopolysiloxane, such as heating the product of step (II).

Accordingly, the fluoroplastic composition is typically prepared by thoroughly dispersing the silicone base (D) in a modified FC resin and then vulcanizing the silicone base using a radical initiator agent, component (E). Mixing is carried out in any device that is capable of uniformly dispersing the components in the FC resin, such as an internal mixer or an extruder. Alternatively, the mixing steps (I) and (II) as well as the dynamic vulcanization embodiment of step (III) of the present method can be accomplished by using a twin screw extruder. As previously noted, the FC resin must be modified before adding components (D) through (F). After modification of the FC resin, the order of mixing components (D) through (F) can be determined by one skilled in the art. Typically (F) would be added after (E) but it is not critical as long as (F) does not interfere with cure of the elastomer phase (e.g., (F) can be premixed with the FC resin or with the base).

In a typical mixing procedure, the FC resin (A) and compatibilizer (B) are first mixed in a mixer at a controlled temperature and then when used, catalyst (C) is added. The temperature used during this (chemical) modification step is experimentally determined so as to impart an optimum half-life for the initiator (C). During this step, component (C) must be thoroughly mixed into the FC resin/compatibilizer combination as it concurrently decomposes to a sufficient extent to graft the compatibilizer to the FC resin (A) in the time allotted. If the temperature is too high, the initiator decomposes prematurely and modification of the FC resin is inefficient; if the temperature is too low, not enough initiator decomposes and little modification of the FC resin results. It is preferred to thoroughly mix the compatibilizer with the FC resin before adding catalyst (C).

Modification of the FC resin can be accomplished in one step, just prior to addition of silicone base (D), and radical initiator (E). Alternatively, the FC resin can be prepared in two steps, modifying the FC resin first, removing it from the mixer then in a subsequent step adding the modified FC resin back to the mixer with silicone base (D), and radical initiator (E).

While any mixing techniques, known for mixing such fluoroplastic materials, can be employed in the method of the present invention, extrusion processes are typically employed. The mixing steps (I) and (II), as well as step (III) when dynamic vulcanization is used, can be accomplished by using a twin-screw extruder. In one embodiment of the present inventive method, the mixing is conducted on a twin-screw extruder in a time period of less than 5 minutes.

Additional components can be added to the fluoroplastic silicone composition. These include blending other fluoroplastics or other fluoroplastic silicone compositions into the fluoroplastic silicone composition of the present invention. These additional components can also be any component or ingredient typically added to a fluoroplastics. Typically, these components can be selected from fillers and processing aids. Many commercially available fluoroplastics can already comprise these additional components.

The fluoroplastic of the present invention can be processed by conventional techniques, such as extrusion, vacuum forming, injection molding, blow molding or compression molding, to fabricate plastic parts. Moreover, these compositions can be re-processed (recycled) with little or no degradation of mechanical properties. These novel fluoroplastics find utility in the fabrication of wire and cable insulation, such as plenum wire, automotive and appliance components, belts, hoses, construction seals and in general rubber applications.

EXAMPLES

The following examples are presented to further illustrate the compositions and method of this invention, but are not construed as limiting the invention, which is delineated in the appended claims. All parts and percentages in the examples are on a weight basis and all measurements were obtained at approximately 23° C., unless otherwise indicated.

Materials

GP-30 is a silicone rubber base marketed by Dow Corning Corporation as Silastic® GP-30 Silicone Rubber.

GP-50 is a silicone rubber base marketed by Dow Corning Corporation as Silastic® GP-50 Silicone Rubber.

LCS-755 is a silicone rubber base marketed by Dow Corning Corporation as Silastic® LCS-755 Silicone Rubber.

LS-2840 is a fluorosilicone rubber base marketed by Dow Corning Corporation as Silastic® LS-2840 Fluorosilicone Rubber, which also contains 5 parts of Gama-Sperse® CS-11 marketed by Georgia Marble Company.

COMPATIBILIZER 1 is a hydroxy end-blocked methylvinylsiloxane oligomer having a viscosity of about 35 mPa-s and containing 30% —CH=$CH_2$ groups and 3% OH groups.

COMPATIBILIZER 2 is a fluorocarbon terpolymer terminated with iodine on one end with a Mooney (ML1+10) of 21.

TAIC is triallyl isocyanurate (CAS# 1025-15-6) (72%) adsorbed on calcium silicate and marketed by Akrochem Corporation as Akrosorb™ 19251 (B) TAIC (72).

THV220G is a fluoroplastic terpolymer composed of tetrafluoroethylene, hexafluoropropylene and vinylidene fluoride with a melting point 120° C. and marketed by Dyneon A 3M Company as Dyneon™ Fluorothermoplastics THV 220G.

THV610G is a fluoroplastic terpolymer composed of tetrafluoroethylene, hexafluoropropylene and vinylidene fluoride with a melting point 185° C. and marketed by Dyneon A 3M Company as Dyneon™ Fluorothermoplastics THV 610G.

Kynar 2500 is a fluoroplastic copolymer and is marketed by ATOFINA Chemicals, Inc. as Kynar Flex® 2500.

Kynar 2750 is a fluoroplastic copolymer and is marketed by ATOFINA Chemicals, Inc. as Kynar Flex® 2750.

Kynar 460 is a fluoroplastic homopolymer and is marketed by ATOFINA Chemicals, Inc. as Kynar® 460.

Trigonox 101—is 2,5-dimethyl-2,5-di(tert-butylperoxy)hexane (CAS# 78-63-7). Marketed by Akzo Novel Chemicals, Inc. as TRIGONOX® 101.

Trigonox 145—is 2,5-dimethyl-2,5-di(tert-butylperoxy)hexyne-3, 45% supported on calcium carbonate (CAS# 1068-27-5). Marketed by Akzo Novel Chemicals, Inc. as TRIGONOX® 145-45B-pd.—

Trigonox A-W70—is tert-Butyl hydroperoxide, 70% aqueous solution (CAS# 75-91-2). Marketed by Akzo Novel Chemicals, Inc. as TRIGONOX® A-W70.

Example 1

THV220G (235.79 g) was added to a 310 ml Haake bowl equipped with roller rotors at 170° C. and 50 rpm. 5 minutes after it melted, Compatibilizer 1 (2.2 g) was added. Rotor speed was reduced to 10 rpm's to incorporate all Compatibilizer 1. Rotor speed was then increased stepwise to 60 rpm's over an 20 minute period and mixed for 5 minutes. Trigonox 101 (0.6 g) was then added. After 5 minutes, GP-50 (91.86 g) was added and mixed for 5 minutes. Trigonox 101 (1.60 g) was added and the resulting resin composition was mixed until the torque stabilized which was approximately 5 minutes.

The resin composition was hot pressed into plaques. Physical testing was performed 24 hours after compression molding. Tensile and elongation were measured according to ASTM D412, Die Standard D at 500 mm/min. Example 1 gave a tensile strength of 8.5 MPa and 410% elongation.

Example 2

Kynar 2500 (215.3 g) was added to a 310 ml Haake bowl equipped with roller rotors at 165° C. and 60 rpm. 5 minutes after it melted, Compatibilizer 1 (5.3 g) was added. Rotor speed was reduced to 5 rpm's to incorporate all Compatibilizer 1. Rotor speed was then increased stepwise to 60 rpm's over an 15 minute period and mixed for 10 minutes. Trigonox 101 (1.29 g) was then added. After 10 minutes, GP-50 (92.0 g) was added and mixed for 5 minutes. Trigonox 101 (2.8 g) was added and the resulting resin composition was mixed until the torque stabilized which was approximately 5 minutes.

The resin composition was hot pressed into plaques. Physical testing was performed 24 hours after compression molding. Tensile and elongation were measured according to ASTM D412, Die Standard D at 500 mm/min. Example 2 had a tensile strength of 8.5 MPa and 302% elongation.

Example 3

THV220G (235.8 g) was added to a 310 ml Haake bowl equipped with roller rotors at 185° C. and 60 rpm. 5 minutes after it melted, Compatibilizer 1 (2.3 g) was added. Rotor speed was reduced to 5 rpm's to incorporate all Compatibilizer 1. Rotor speed was then increased stepwise to 60 rpm's over an 10 minute period and mixed for 5 minutes. Trigonox 101 (0.6 g) was then added. After 10 minutes, GP-30 (92.66 g) was added and mixed for 5 minutes. Trigonox 101 (1.38 g) was added and the resulting resin composition was mixed until the torque stabilized which was approximately 5 minutes.

The resin composition was hot pressed into plaques. Physical testing was performed 24 hours after compression molding. Tensile and elongation were measured according to ASTM D412, Die Standard D at 500 mm/min. Example 3 had a tensile strength of 10.7 MPa and 445% elongation.

Example 4

Kynar 460 (210 g) was added to a Haake Rheomix 3000 bowl equipped with banbury rotors at 165° C. and 50 rpm and mixed until melted. TAIC (3 g) and Trigonox 145 (1 g) were added. Rotor speed was increased to 75 rpm's mixed for 10 minutes. GP-50 (140 g) was added and mixed for 10 minutes. Trigonox A-W70 (2 g) was added and the resulting resin composition was mixed approximately 5 minutes. Sample 4A was removed from the Haaka and statically cured in a press for 10 minutes at 225° C. Sample 4B was dynamically cured in the Haaka at 150 rpm and mixed until the torque was stabilized. The resin composition was hot pressed into plaques. Tensile and elongation were measured according to ASTM D412, Die Standard D at 500 mm/min. Example 4A had a tensile strength of 8.3 MPa and 12% elongation and a Shore D Durometer of 39. Example 4B had a tensile strength of 7.2 MPa and 14% elongation and a Shore D Durometer of 33.

Example 5

Kynar 2750 (223 g), LS-2840 (180 g) and for Sample 5B and Sample 5C only COMPATIBILIZER 2 (3 g) were added to a Haake Rheomix 3000 bowl equipped with banbury rotors 50 rpm and mixed at a chamber temperature of 200° C. until the fluoroplastic melted. Trigonox A-W70 (2.5 g) was added and the resulting resin composition was mixed approximately at 100 rpms. Sample 5A and 5B were mixed until the decomposition temperature of the peroxide was reached and the silicone was dynamically cured. Sample 5C was removed from the Haaka after a 10 minute mix and statically cured in a press for 10 minutes at 225° C. The resin composition was hot pressed into plaques. Tensile and elongation were measured according to ASTM D412, Die Standard D at 500 mm/min. Example 5A had a tensile strength of 6.4 MPa and 206% elongation and a Shore D Durometer of 29. Example 5B had a tensile strength of 8.0 MPa and 294% elongation and a Shore D Durometer of 30. Example 5C had a tensile strength of 6.0 MPa and 210% elongation and a Shore D Durometer of 20.

Example 6

THV610G (300 g) and for Sample 6B and Sample 6C only COMPATIBILIZER 1 (3 g) were added to a Haake Rheomix 3000 bowl equipped with banbury rotors 25 rpm and mixed at a chamber temperature of approximately 200° C. until the fluoroplastic melted. For Sample 6B and Sample 6C only, Trigonox 145 (1 g) was added. Rotor speed was increased to 125 rpm's mixed for 10 minutes. LCS-755 (115 g) was added and mixed for 2 minutes. Trigonox A-W70 (2 g) was added. Sample 6A and 6B were mixed until the decomposition temperature of the peroxide was reached and the silicone was dynamically cured. Sample 6C was removed from the Haaka after a 10 minute mix and statically cured in a press for 10 minutes at 225° C. The resin composition was hot pressed into plaques. Tensile and elongation were measured according to ASTM D412, Die Standard D at 500 mm/min. Example 6A had a tensile strength of 4.2 MPa and 206% elongation and a Shore D Durometer of 28. Example 6B had a tensile strength of 7.4 MPa and 305% elongation and a Shore D Durometer of 31. Example 6C had a tensile strength of 5.6 MPa and 99% elongation and a Shore D Durometer of 31.

The invention claimed is:

1. A method for preparing a fluoroplastic composition comprising:
   (I) mixing
      (A) a fluorocarbon resin having a glass transition temperature above 23° C.,
      (B) a compatibilizer selected from the group consisting of;
         (B') organic compounds which contain 2 or more olefin groups,
         (B") organopolysiloxanes containing at least 2 alkenyl groups and
         (B''') olefin-functional silanes which also contain at least one hydrolyzable group or at least one hydroxyl group attached to a silicon atom thereof
      (C) an organic peroxide catalyst,
   (II) mixing the product of step (I) with
      (D) a silicone base comprising a diorganopolysiloxane gum consisting of $(R_3SiO_{0.5})$, $(R_2SiO)$, $(RSiO_{1.5})$, and/or O units $(SiO_2)$ structural units where R is independently any monovalent hydrocarbon group, and contains at least 2 alkenyl groups having 2 to 20 carbon atoms, wherein the diorganopolysiloxane gum has a sufficient molecular weight to impart a Williams plasticity number of at least 30 as determined by the American Society for Testing and Materials (ASTM) test method D 926,
      (E) a radical initiator in an amount sufficient to cure said diorganopolysiloxane; and
   (III) dynamically vulcanizing the diorganopolysiloxane wherein the weight ratio of fluorocarbon resin (A) to silicone base (D) in the elastomeric base composition ranges from 95:5 to 30:70.

2. The method of claim 1 wherein the fluorocarbon resin (A) is a fluoroplastic homopolymer, copolymer, or terpolymer comprising monomers selected from the group of tetrafluoroethylene, hexafluoropropylene, chlorotrifluoroethylene, and vinylidene fluoride monomers.

3. The method of claim 1 wherein the radical initiator is an organic peroxide.

4. The method of claim 1 wherein the dynamic vulcanization occurs via an extrusion process.

5. The method of claim 4 wherein the extrusion process occurs in a twin screw extruder.

6. A fluoroplastic composition produced by the method of claim 1.

* * * * *